(12) United States Patent
Kravtsov et al.

(10) Patent No.: US 9,722,650 B2
(45) Date of Patent: Aug. 1, 2017

(54) METHOD FOR NOISE POWER ESTIMATION (71) Applicant: INTEL CORPORATION, Santa Clara, CA (US)

(72) Inventors: Vladimir Kravtsov, Jerusalem (IL); Yaakov Ben-Bassat, Bat-Yam (IL); Michael Genossar, Modiin (IL)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 14/570,442

(22) Filed: Dec. 15, 2014

(65) Prior Publication Data

US 2016/0173150 A1 Jun. 16, 2016

(51) Int. Cl.
| | |
|---|---|
| *H04L 12/50* | (2006.01) |
| *H04B 1/10* | (2006.01) |
| *H04W 24/08* | (2009.01) |
| *H04B 17/345* | (2015.01) |
| *H04B 17/336* | (2015.01) |

(52) U.S. Cl.
CPC ......... *H04B 1/1027* (2013.01); *H04B 17/345* (2015.01); *H04W 24/08* (2013.01); *H04B 17/336* (2015.01)

(58) Field of Classification Search
CPC .............................. H04B 1/1027; H04W 24/08
USPC .................................. 370/251, 252, 253, 254
See application file for complete search history.

(56) References Cited

U.S. PATENT DOCUMENTS

| | | | |
|---|---|---|---|
| 6,034,952 A | 3/2000 | Dohi et al. | |
| 7,920,599 B1 | 4/2011 | Subramanian et al. | |
| 8,098,714 B2 | 1/2012 | Mourad | |
| 2004/0264604 A1 | 12/2004 | Malette et al. | |
| 2007/0201539 A1 | 8/2007 | Yu et al. | |
| 2013/0003802 A1 | 1/2013 | Doron et al. | |
| 2013/0287135 A1* | 10/2013 | Cheng .................. | H04B 17/318 375/285 |

OTHER PUBLICATIONS

Extended European Search report received for European Patent Application No. 15194402.2, mailed on May 23, 2016, 2 pages.
Office Action and Search Report received for Taiwan Patent Application No. 104137180, mailed on Oct. 26, 2016, 7 pages of Taiwan Office Action including 4 pages of English Translation.
Office Action received for Taiwan Patent Application No. 104137180, dated Mar. 13, 2017, 6 pages of Taiwan Office Action including 4 pages of English Translation.

* cited by examiner

*Primary Examiner* — Dang Ton
(74) *Attorney, Agent, or Firm* — Schiff Hardin LLP (57) ABSTRACT

Described herein are technologies related to an implementation of noise power estimation in a receiver of a device.

20 Claims, 4 Drawing Sheets

METHOD FOR NOISE POWER ESTIMATION

BACKGROUND

For wireless communication systems, signal quality may depend largely in part on the amount of spurious signals, noise, and other conditions at a receiver circuitry of a device. As such, noise estimation and other methodologies for suppressing the spurious signals may provide an indication of the performance of the receiver circuitry in the device. For example, the noise estimation may provide the amount and characteristics of the noise that may be present at the receiver circuitry. In this example, the noise estimation may be crucial during demodulation and decoding of the signal in order to lower the error rate of the decoded data.

For an effective receiver, it is important to have knowledge of or at least be able to accurately estimate the noise power at the receiver. In communication systems, noise power is typically estimated by measuring the received signal power in time and/or frequency slots, which are not used for data transmission in the system. These slots are typically the guard times and guard bands in time and frequency domain, respectively. However, guard times and guard bands may not always be available and thus do not always provide an efficient basis for this method of noise estimation.

As such, there is a need to solve in a cheap and unique way the above mentioned problem i.e., noise power estimation at the receiver of the device.

DETAILED DESCRIPTION

Described herein is a technology for implementing noise power estimation in a receiver of a device. For example, the receiver of the device receives a data packet that includes a periodicity feature in its preamble. In this example, the data packet may include two or more samples from the preamble or a periodic sequence.

In an implementation, squaring an absolute value of each sample is implemented for purposes of determining the noise power estimation in order to eliminate effects of a frequency offset (FO) and phase noise (PN). In this implementation, a first expectation value i.e., $E(|y|^2)$ may be derived from an average of the squared absolute value of each sample. Furthermore, a power difference between a pair of input samples may be determined, and then used as a basis for squaring and averaging to obtain, for example, a second expectation value i.e., $E(S^2)$.

With the determined first and second expectation values, a level of signal-to-noise ratio (SNR) of the received data packet may be derived. Depending upon this SNR level, a third expectation value (i.e., Sig1) or a fourth expectation value (i.e., Sig2) may be determined for a low-level SNR and a high-level SNR, respectively. The third expectation value Sig1 or the fourth expectation value Sig2 may be the basis for the noise power estimation after DC compensation. The DC compensation, for example, may be implemented due to DC pre-filtering-which may be part of the noise power estimation process.

Figure 1:
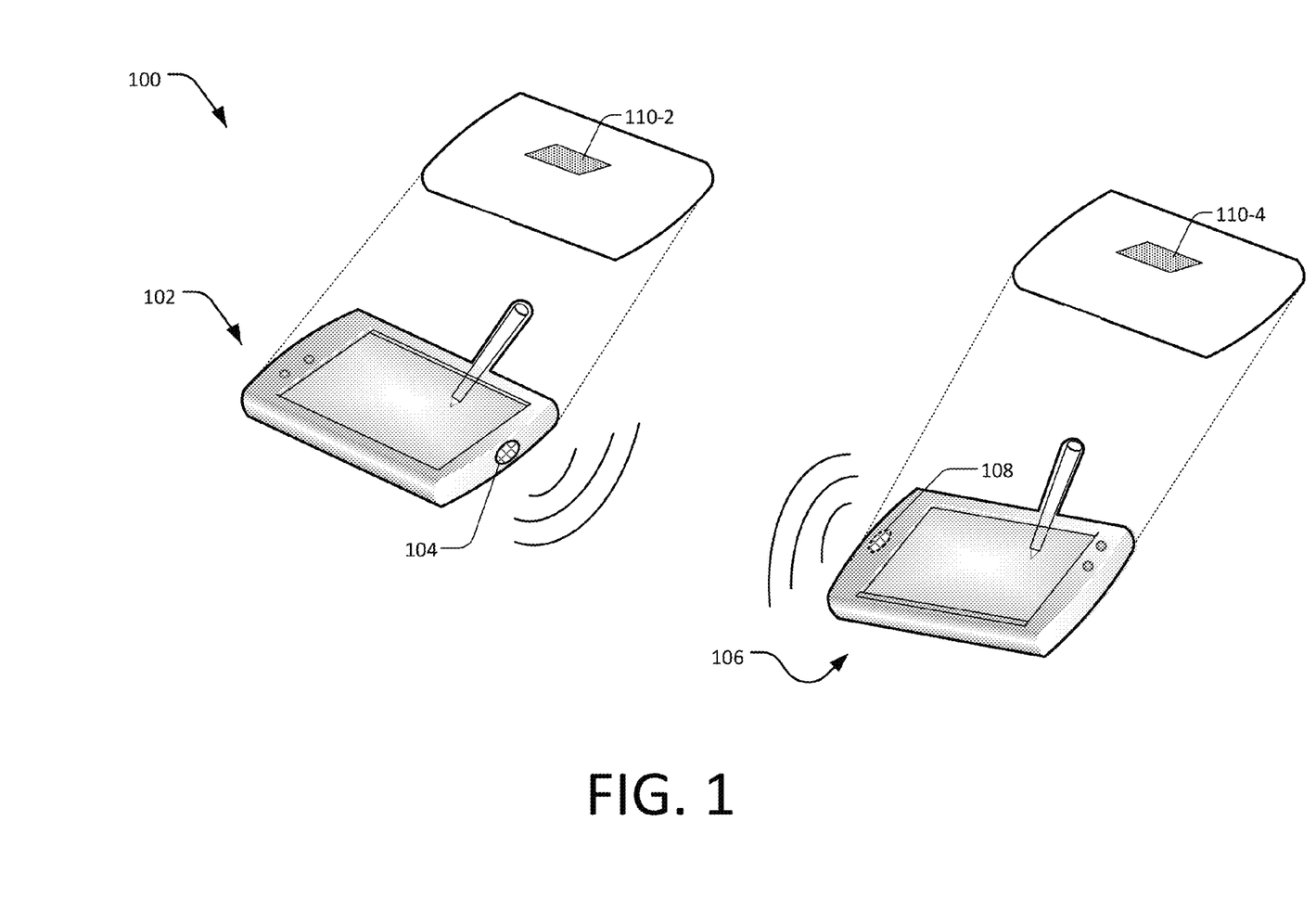
FIG. 1 illustrates an example scenario that implements noise power estimation in a portable device.

FIG. 1 is an example scenario 100 that utilizes a noise power estimation in a receiver circuitry or system of a device. The scenario 100 shows a device 102 with an antenna 104, and another device 106 with an antenna 108. Furthermore, the scenario 100 illustrates a noise power estimator 110 for each of devices 102 and 106 for purposes of illustrating implementations described herein.

The devices 102 or 106 may include, but are not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. Furthermore, the devices 102 or 106 may include, but are not limited to, non-portable devices such as a personal computer, nor limited to wireless devices such as when connected through a cable.

The device 102, for example, may communicate with the other device 106 in a network environment. The network environment, for example, includes a cellular network configured to facilitate communications between the devices 102 and 106 using a base station (not shown). During this cellular network communications, a noise power estimation, for example, may be implemented by the receiving device 102 through its noise power estimator 110-2. The noise power estimation, in this example, may be utilized by the receiving device 102 for purposes of determining minimum mean square error (MMSE) equalizer coefficients, signal-to-noise (SNR) determinations such as for link adaptation, and the like.

In an implementation, the noise power estimator 110 may utilize a periodicity feature of a preamble or periodic sequence of a received data packet. For example, the noise power estimator 110 may eliminate effects of various impairments such as the FO and the PN by squaring absolute values of input samples taken from a periodic signal. In this example, computing the squared absolute value of each sample from the periodic signal, and utilizing it for the noise power estimation, may eliminate the effects of impairments on the noise power estimate.

Figure 2:
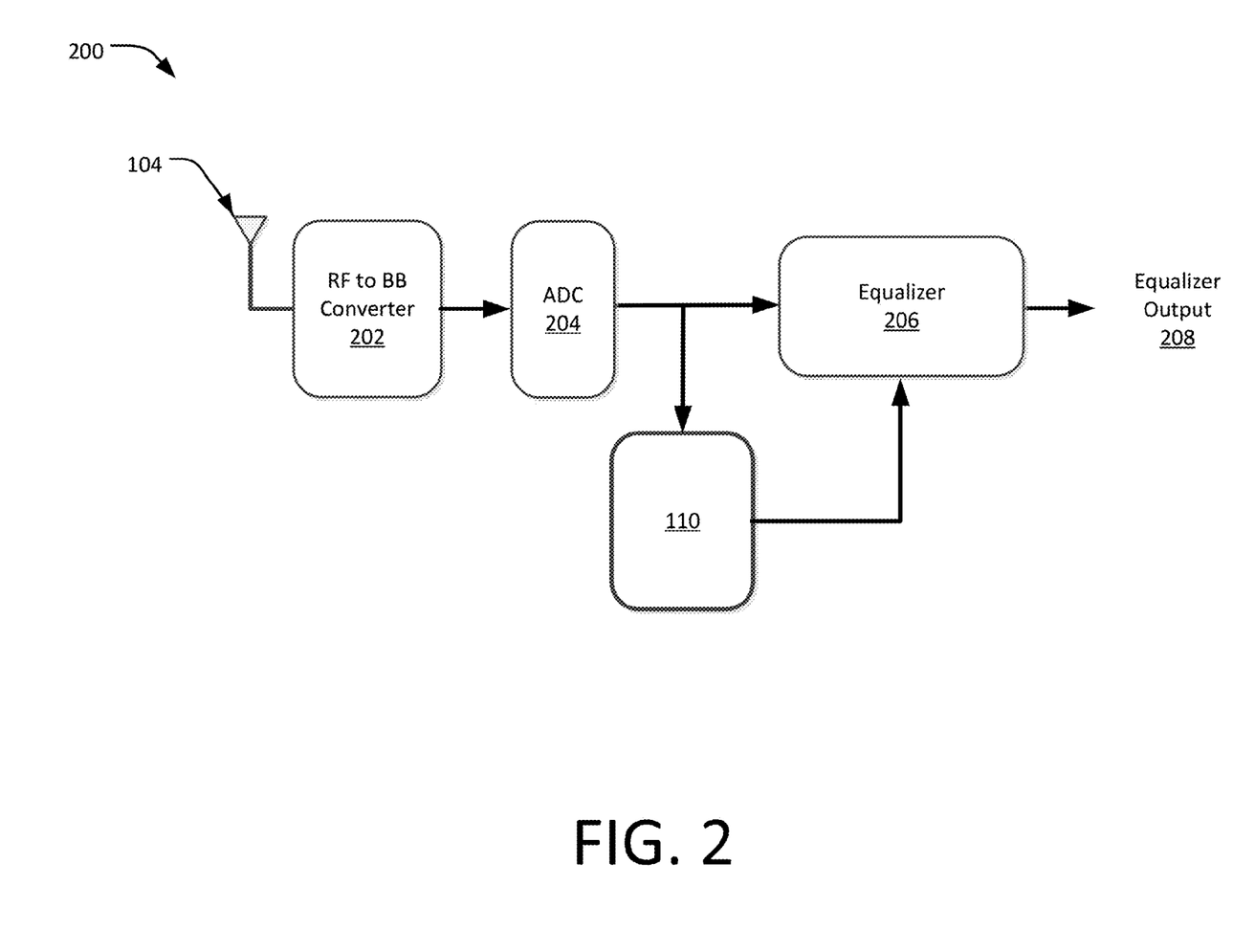
FIG. 2 illustrates an example block diagram of a portable device receiver in accordance with implementations described herein.

FIG. 2 is an example block diagram 200 of a receiver configuration of the receiving device as described in implementations herein. As shown, the block diagram 200 may include the antenna 104, a radio frequency (RF) to baseband (BB) signal converter 202, an analog-to-digital converter (ADC) 204, the noise power estimator 110, an equalizer component 206, and equalizer output 208.

In an implementation, transmitted RF signals containing data packets may be received by the antenna 104. In this implementation, the RF to BB converter 202 may transform the RF signals into analog baseband signals. The analog baseband signals may then be converted into digital signals by the ADC 204.

Prior to transformation of the digital baseband signals from a time-domain to a frequency-domain signal by a Fast Fourier Transform (FFT) (not shown), the noise power estimator 110 may be configured to estimate noise power in the received data packets. However, in other standards where no transformation from time-domain to the frequency-domain signal is required as part of the equalization process, the same principle described above may similarly apply. The process for determinations or estimation of the noise power is further discussed in details in FIG. 3.

With the estimated noise power, the equalizer 206 may utilize the estimated noise power for purposes of determining minimum mean square error (MMSE) equalizer coefficients. A communication system may also use the estimated noise power for signal-to-noise (SNR) determinations such as for link adaptation, and the like. The equalizer output 208 may include the demodulated data packets.

Although the example block diagram 200 illustrates in a limited manner basic components of the receiver of the device, other components such as battery, one or more processors, SIM card, etc. were not described in order to simplify the embodiments described herein.

Figure 3:
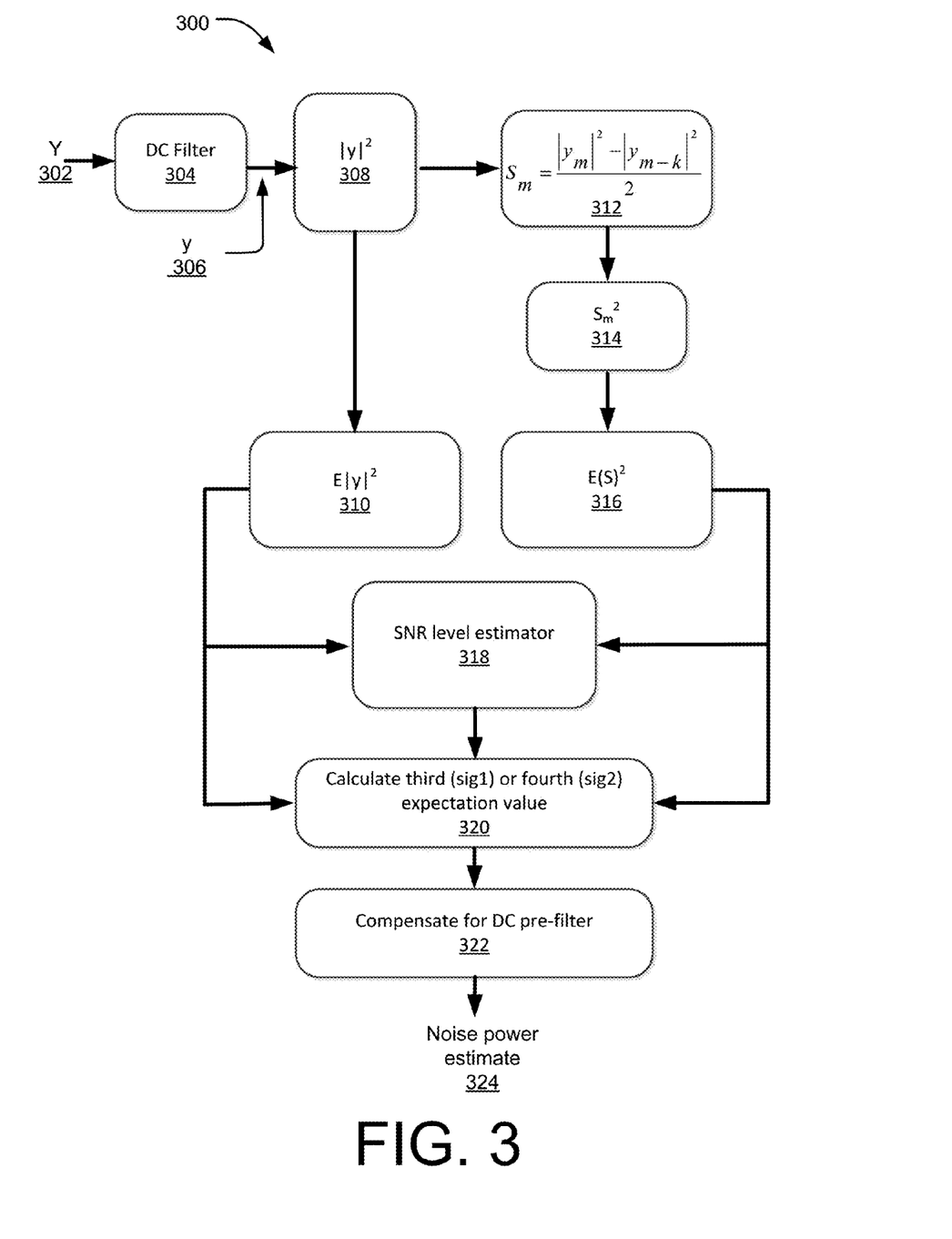
FIG. 3 illustrates an example illustration of noise power estimation in accordance with implementations described herein.

FIG. 3 is a block diagram 300 illustrating the noise power estimation in the noise power estimator 110. Components of the block diagram 300 may be implemented as a circuitry incorporated at the noise power estimator 110, or it may be implemented by a software or a firmware program executed by the one or more processors, or a separate processing circuit coupled to the receiver circuitry of the device.

In an implementation, the noise power estimation in the block diagram 300 is implemented at the periodic packet preamble—of a received data packet Y 302. In this implementation, the periodicity of the preamble is exploited to provide resiliency to timing errors in the received data packet.

With the received data packet Y 302, which includes two or more signal samples from a periodic sequence, a DC filter 304 may be configured to pre-filter DC components of the received data packet Y 302 to provide an output signal y 306. In this manner, spurious effects of a DC offset to the noise power estimator 110 are eliminated or minimized.

In an implementation, a sample squaring component 308 may square an absolute value of each sample in the output signal y 306. By computing the squared absolute value of each sample in the output signal y 306, and by using this computation for purposes of noise power estimation, the effects of the frequency offset (FO) and phase noise (PN) may be eliminated. At this stage, a first expectation value estimator i.e., $E(|y|^2)$ 310 may be configured to derive a first expectation value based upon an average of the squared absolute value of each sample from the sample squaring component 308. Furthermore, a component 312 may be configured to determine a difference between a pair of samples from the output of the sample squaring component 308.

For example, the component 312 implements the following equation (1):

$$S_m = (|y_m|^2 - |y_{m-k}|^2)/2 \quad (1)$$

where $S_m$ is the difference between power (or power difference) of the pair of input samples, k is the length of a period of the packet preamble or periodic sequence, and variables $y_m$ and $y_{m-k}$ are the input pair of samples in the preamble that are "k" samples apart. In the example above, the resulting value (i.e., output) from the determination at block 312 is squared by a squaring component 314.

When the received data packet Y 302 does not suffer from DC impairments; thermal noise that is assumed to have Gaussian distribution; and noise samples that are assumed to be uncorrelated when they are "k" samples apart, equations (2) and (3) below may be assumed:

$$E(|y|^2) = \sigma^2 + P \quad (2)$$

$$E(S^2) = \frac{1}{2}(\sigma^2)^2 + P\sigma^2 \quad (3)$$

where variable $E(S^2)$ denotes a second expectation value based upon the output of the squaring component 314, variable $\sigma^2$ is an average noise power, and variable P is an average received signal power.

Based upon the equations (2) and (3) above, the average noise power variable $\sigma^2$ may be derived.

In an implementation, an SNR level estimator 318 may determine a ratio "x" using an equation (4) as shown below:

$$x \equiv 2E(S^2)/E(|y|^2)^2 \quad (4)$$

where x is the determined ratio, the variable $E(S^2)$ denotes the second expectation value based upon the output of the squaring component 314, and the variable $E(|y|^2)$ denotes the first expectation value based upon the average of the squared absolute value of each sample of the preamble.

The SNR level estimator 318, for example, may compare the derived value of ratio "x" to a particular configured threshold value. For example, the configured threshold value may be utilized to determine if the received data packet Y 302 includes a high-level SNR, or a low-level SNR.

When the determined ratio "x"—based on the equation (4)—is greater than the configured threshold value, the data packet Y 302 is considered to include low-level SNR values. On the other hand, when the ratio "x" is lower than the configured threshold value, the data packet Y 302 is considered to include high-level SNR values.

Depending upon the level of the SNR as described above, the noise power estimation may be based upon a third expectation value "sig1" for the low-level SNR, or a fourth expectation value "sig2" for the high-level SNR.

In an implementation, an estimator 320 is configured to determine the third expectation value "sig1" using equation (5) below:

$$Sig1 \equiv E(|y|^2) - \sqrt[2]{E(|y|^2)^2 - 2E(S^2)} \quad (5)$$

where the variable Sig1 is the third expectation value, the variable $E(S^2)$ denotes the second expectation value, and the variable $E(|y|^2)$ denotes the first expectation value.

Similarly, the estimator 320 is configured to determine the fourth expectation value "sig2" using equation (6) below:

$$Sig2 \equiv E(S^2)/E(|y|^2) \approx P\sigma^2/P = \sigma^2 \quad (6)$$

where the variable Sig2 is the fourth expectation value, the variable $E(S^2)$ denotes the second expectation value, the variable $E(|y|^2)$ denotes the first expectation value, variable $\sigma^2$ is the average noise power, and variable P is the average received signal power.

With continuing reference to FIG. 3, a DC pre-filter compensator 322 may be configured to compensate for the effects of the previous pre-filtering by the DC filter 304. For example, when the data packet Y 302 is determined to include low-level SNR, the DC compensator 322 is configured to operate on the resulting value of the third expectation value Sig1. Otherwise, for the high-level SNR, the DC compensator 322 is configured to operate on the resulting value of the fourth expectation value Sig2.

The Sig1 or Sig2 output after being compensated by DC pre-filter compensator 322, may now be the estimated noise power at the noise power estimate 324. For example, the output of the noise power estimate 324 may now be used for determining the MMSE equalizer coefficients, SNR determination such as for link adaptation, and the like.

Figure 4:
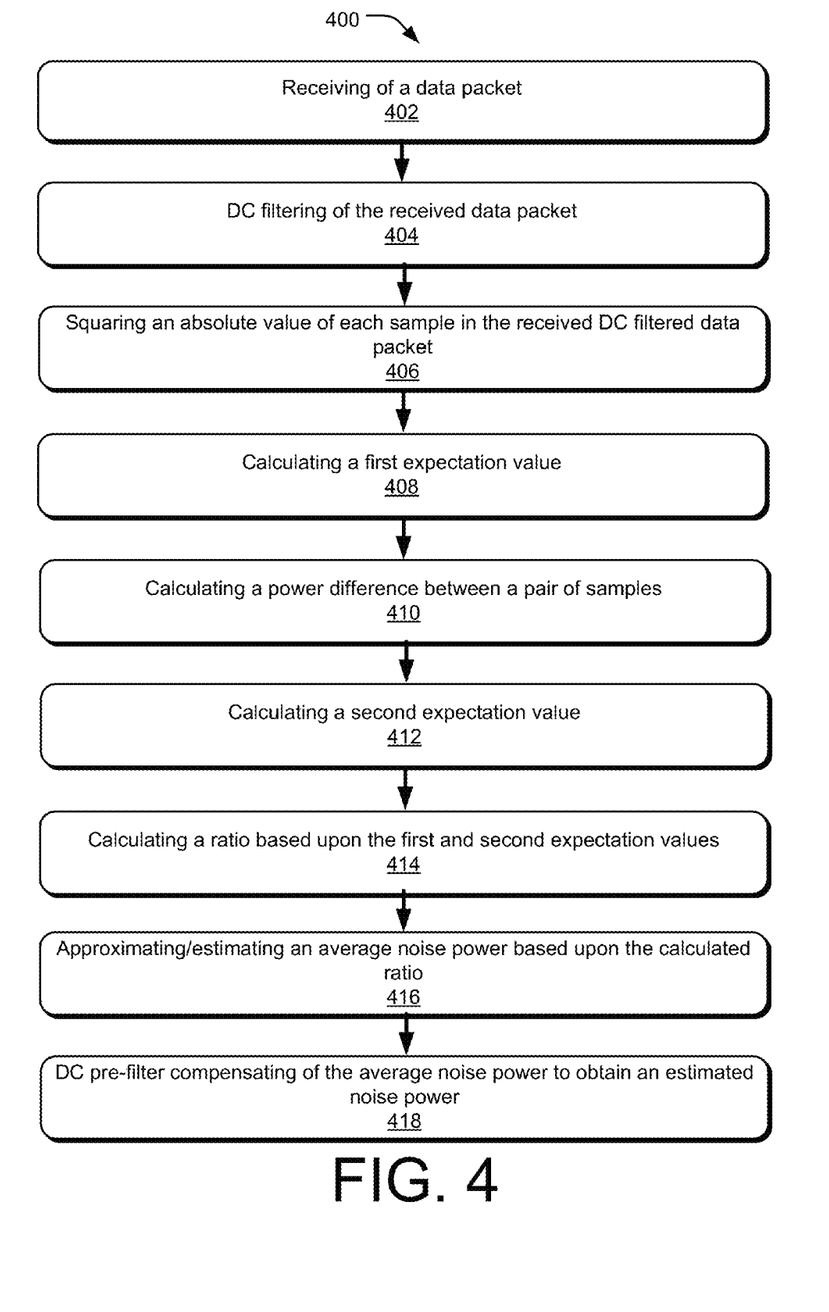
FIG. 4 illustrates an exemplary process for implementing noise power estimation in accordance with implementations described herein.

FIG. 4 is an example process flowchart 400 illustrating an example method for noise power estimation in a receiver circuitry of a device. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, receiving of a data packet is performed. For example, the data packet Y 302 is received through the antenna 110 of a receiving device 102. In this example, the signal Y 302 may include two or more samples from a periodic sequence or preamble.

At block 404, DC filtering of the received data packet is performed. For example, the DC filter 304 performs DC pre-filtering of the data packet Y 302 to improve accuracy of the noise power estimation as described in present implementations herein.

At block 406, squaring an absolute value of each sample of the DC filtered data packet is performed. For example, the sample squaring component 308 may square an absolute value of each sample in the output signal y 306. The output signal y 306, in this example, is the output of the DC filter 304.

By computing the squared absolute value of each sample in the output signal y 306, and by using this computation for purposes of noise power estimation, the effects of the frequency offset (FO) and phase noise (PN) may be eliminated.

At block 408, determining a first expectation value based upon an average of the squared absolute value of each sample is performed. For example, the first expectation value is based upon the average of the squared absolute value of each sample as described in block 406 above.

At block 410, determining a power difference between a pair of samples is performed.

At block 412, determining a second expectation value based upon an average of a squared determined power difference is performed. For example, the determined power difference at block 410 is squared and then averaged to derive the second expectation value.

At block 414, determining a ratio based upon the first and second expectation values is performed. For example, the SNR level estimator 318 is configured to determine the ratio using the first and second expectation values. In this example, the determined ratio is utilized to determine the level of SNR. The determination of the level of SNR, for example, includes comparing of the determined ratio against a configured threshold value.

In other implementations, the estimation of the level of SNR may be based on measurements other than the determined ratio. For example, a direct measurement of the noise is implemented, and thereafter compared to a particular threshold value. In this example, the direct measurement is utilized to estimate the level of the SNR.

At block 416, approximating an average noise power based upon the determined ratio is performed. For example, the approximation includes a determination of the third and fourth expectation values.

In an implementation, and to improve accuracy of the noise power estimation, the determinations described above may be performed over multiple pairs of periods from the preamble.

At block 418, DC pre-filter compensating of the approximated average noise power is performed. For example, the DC pre-filter compensation of the determined third expectation value "sig1" or the determined fourth expectation values "sig2"" may be performed to improve accuracy of the noise power estimate.

Furthermore, an additional decimation on the input and/or output of the DC filter may be performed to reduce computational and hardware complexity.

The following examples pertain to further embodiments:

Example 1 is a method of noise power estimation comprising: receiving a data packet that includes a plurality of samples from a periodic sequence; determining an absolute value of each of the plurality of samples, and determining a first expectation value based on an average of squaring the absolute value of each of the plurality of samples; determining a power difference between two or more of the plurality of samples and determining a second expectation value based on an average of squaring the determined power difference; and estimating an average noise power based on the first and second expectation values.

In example 2, the method as recited in example 1, wherein the two or more of the plurality of samples are taken from a periodic packet preamble.

In example 3, the method as recited in example 1, wherein the estimated average noise power is determined by:

$$\hat{\sigma}^2 \equiv E(|y|^2) - \sqrt[2]{E(|y|^2)^2 - 2E(S^2)}$$

wherein variable $\hat{\sigma}^2$ is the estimated average noise power, variable $E(S2)$ denotes the second expectation value, and variable $E(|y|2)$ denotes the first expectation value.

In example 4, the method as recited in example 1 further comprising: determining a ratio based upon the first and second expectation values; determining a level of signal-to-noise ratio (SNR) based on the determined ratio, wherein the determining of the level of SNR includes comparing the determined ratio against a configured threshold value; and approximating the average noise power based on the determined level of SNR, wherein the approximating includes determining a third expectation value or a fourth expectation value.

In example 5, the method as recited in example 4, wherein the ratio is determined as:

$$x = 2E(S^2)/E(|y|^2)^2$$

wherein variable x is the determined ratio, variable $E(S2)$ denotes the second expectation value, and variable $E(|y|2)$ denotes the first expectation value.

In example 6, the method as recited in example 4, wherein the third expectation value is determined in response to the determining the ratio that is greater than the configured threshold value, the third expectation value is determined as:

$$Sig1 \equiv E(|y|^2) - \sqrt[2]{E(|y|^2)^2 - 2E(S^2)}$$

wherein variable Sig1 is the third expectation value, variable $E(S2)$ denotes the second expectation value, and variable $E(|y|2)$ denotes the first expectation value.

In example 7, the method as recited in example 4, wherein the fourth expectation value is determined in response to determining the ratio that is lesser than the configured threshold value, the fourth expectation value is determined as:

$$Sig2 \equiv E(S^2)/E(|y|^2) \approx P\sigma^2 - P = \sigma^2$$

wherein variable Sig2 is the fourth expectation value, variable $E(S^2)$ denotes the second expectation value, variable $E(|y|^2)$ denotes the first expectation value, variable $\sigma^2$ is the average noise power, and variable P is an average received signal power.

In example 8, the method as recited in example further comprising: performing a DC pre-filter compensation on the third or fourth expectation values.

In example 9, the method as recited in any of examples 1 to 8 further comprising: performing a DC filtering on the received data packet.

In example 10, the method as recited in any of examples 1 to 8, wherein the estimation of the average noise power is implemented in a IEEE 802.11ad receiver.

Example 11 is a device receiver comprising: a direct current (DC) filter configured to receive and pre-filter a data packet that includes a plurality samples from a periodic sequence; a sample squaring component configured to square an absolute value of each sample, wherein a first expectation value is determined based upon an average of the squared absolute value of each sample; a component configured to determine a power difference between a pair of samples, wherein a second expectation value is determined based upon an average of a squared determined power difference; an estimator configured to estimate an average noise power based upon the first and second expectation values; and a DC Pre-Filter compensator configured to perform DC pre-filter compensation on the determined average noise power to obtain an estimated noise power.

In example 12, the device receiver as recited in example 11, wherein the estimated average noise power is determined as:

$$\hat{\sigma}^2 \equiv E(|y|^2) - \sqrt[2]{E(|y|^2)^2 - 2E(S^2)}$$

wherein variable $\hat{\sigma}^2$ is the estimated average noise power, variable $E(S^2)$ denotes the second expectation value, and variable $E(|y|^2)$ denotes the first expectation value.

In example 13, the device receiver as recited in example 11 further comprising: a signal-to-noise (SNR) level estimator configured to determine a ratio based upon the first and second expectation values, the determined ratio is compared to a configured threshold value in order to determine a level of SNR, wherein the estimator approximates the average noise power based upon the determined level of SNR, the approximation includes a determination of a third expectation value or a fourth expectation value.

In example 14, the device receiver as recited in example 11, wherein the ratio is determined as:

$$x \equiv 2E(S^2)/E(|y|^2)^2$$

wherein variable x is the determined ratio, variable $E(S^2)$ denotes the second expectation value, and variable $E(|y|^2)$ denotes the first expectation value.

In example 15, the device receiver as recited in example 13, wherein the third expectation value is determined for the ratio that is greater than the configured threshold value, the third expectation value is determined as:

$$Sig1 \equiv E(|y|^2) - \sqrt[2]{E(|y|^2)^2 - 2E(S^2)}$$

wherein variable Sig1 is the third expectation value, variable $E(S^2)$ denotes the second expectation value, and variable $E(|y|^2)$ denotes the first expectation value.

In example 16, the device receiver as recited in example 13, wherein the fourth expectation value is determined for the ratio that is lesser than the configured threshold value, the fourth expectation value is determining as:

$$Sig2 \equiv E(S^2)/E(|y|^2) \approx P\sigma^2/P = \sigma^2$$

wherein variable Sig2 is the fourth expectation value, variable $E(S^2)$ denotes the second expectation value, variable $E(|y|^2)$ denotes the first expectation value, variable $\sigma^2$ is the average noise power, and variable P is an average received signal power.

Example 17 is a method of noise power estimation comprising: direct current (DC) filtering of a received data packet that includes two or more samples from a periodic sequence; squaring an absolute value of each sample, wherein a first expectation value is determined based upon an average of the squared absolute value of each sample; determining a power difference between a pair of samples, wherein a second expectation value is determined based upon an average of a squared determined power difference; estimating an average noise power based upon the first and second expectation values; and DC pre-filter compensating of the estimated average noise power.

In example 18, the method as recited in example 17, wherein the estimated average noise power is determined as:

$$\hat{\sigma}^2 \equiv E(|y|^2) - \sqrt[2]{E(|y|^2)^2 - 2E(S^2)}$$

wherein variable $\hat{\sigma}^2$ is the estimated average noise power, variable $E(S^2)$ denotes the second expectation value, and variable $E(|y|^2)$ denotes the first expectation value.

In example 19, the method as recited in any of examples 17 to 18 further comprising: determining a ratio based upon the first and second expectation values; determining a level of signal-to-noise ratio (SNR) based on the determined ratio, wherein the determining of the level of SNR includes comparing of the determined ratio against a configured threshold value; and approximating the average noise power based upon the determined level of SNR, wherein the approximating includes a determination of a third expectation value or a fourth expectation value.

In example 20, the method as recited in example 19, wherein the approximation of the average noise power is performed over multiple pairs of periods from the preamble.

What is claimed is:

1. A method of noise power estimation comprising:
   receiving a data packet that includes a plurality of samples from a periodic sequence;
   determining an absolute value of each of the plurality of samples, and determining a first expectation value based on an average of squaring the absolute value of each of the plurality of samples;
   determining a power difference between two or more of the plurality of samples and determining a second expectation value based on an average of squaring the determined power difference; and
   estimating an average noise power based on the first and second expectation values; and performing a DC pre-filter compensation on the estimated average noise based on the first and second expectation values.

2. The method as recited in claim 1, wherein the two or more of the plurality of samples are taken from a periodic packet preamble.

3. The method as recited in claim 1, wherein the estimated average noise power is determined by:

$$\hat{\sigma}^2 \equiv E(|y|^2) - \sqrt[2]{E(|y|^2)^2 - 2E(S^2)}$$

wherein variable $\hat{\sigma}^2$ is the estimated average noise power, variable $E(S^2)$ denotes the second expectation value, and variable $E(|y|^2)$ denotes the first expectation value.

4. The method as recited in claim 1 further comprising:
determining a ratio based upon the first and second expectation values;
determining a level of signal-to-noise ratio (SNR) based on the determined ratio, wherein the determining of the level of SNR includes comparing the determined ratio against a configured threshold value; and
approximating the average noise power based on the determined level of SNR, wherein the approximating includes determining a third expectation value or a fourth expectation value.

5. The method as recited in claim 4, wherein the ratio is determined as:

$$x \equiv 2E(S^2)/E(|y|^2)^2$$

wherein variable x is the determined ratio, variable $E(S^2)$ denotes the second expectation value, and variable $E(|y|^2)$ denotes the first expectation value.

6. The method as recited in claim 4, wherein the third expectation value is determined in response to the determining the ratio that is greater than the configured threshold value, the third expectation value is determined as:

$$Sig1 \equiv E(|y|^2) - \sqrt[2]{E(|y|^2)^2 - 2E(S^2)}$$

wherein variable Sig1 is the third expectation value, variable $E(S^2)$ denotes the second expectation value, and variable $E(|y|^2)$ denotes the first expectation value.

7. The method as recited in claim 4, wherein the fourth expectation value is determined in response to determining the ratio that is lesser than the configured threshold value, the fourth expectation value is determined as:

$$Sig2 \equiv E(S^2)/E(|y|^2) \approx P\sigma^2/P = \sigma^2$$

wherein variable Sig2 is the fourth expectation value, variable $E(S^2)$ denotes the second expectation value, variable $E(|y|^2)$ denotes the first expectation value, variable $\sigma^2$ is the average noise power, and variable P is an average received signal power.

8. The method as recited in claim 4 further comprising: performing the DC pre-filter compensation on the third or fourth expectation values.

9. The method as recited in claim 1 further comprising: performing a DC filtering on the received data packet.

10. The method as recited in claim 1, wherein the estimation of the average noise power is implemented in a wireless network receiver.

11. A device receiver comprising:
a direct current (DC) filter configured to receive and pre-filter a data packet that includes a plurality samples from a periodic sequence;
a sample squaring component configured to square an absolute value of each sample, wherein a first expectation value is determined based upon an average of the squared absolute value of each sample;
a component configured to determine a power difference between a pair of samples, wherein a second expectation value is determined based upon an average of a squared determined power difference;
an estimator configured to estimate an average noise power based upon the first and second expectation values; and
a DC Pre-Filter compensator configured to perform DC pre-filter compensation on the determined average noise power to obtain an estimated noise power.

12. The device receiver as recited in claim 11, wherein the estimated average noise power is determined as:

$$\hat{\sigma}^2 \equiv E(|y|^2) - \sqrt[2]{E(|y|^2)^2 - 2E(S^2)}$$

wherein variable $\hat{\sigma}^2$ is the estimated average noise power, variable $E(S^2)$ denotes the second expectation value, and variable $E(|y|^2)$ denotes the first expectation value.

13. The device receiver as recited in claim 11 further comprising:
a signal-to-noise (SNR) level estimator configured to determine a ratio based upon the first and second expectation values, the determined ratio is compared to a configured threshold value in order to determine a level of SNR, wherein the estimator approximates the average noise power based upon the determined level of SNR, the approximation includes a determination of a third expectation value or a fourth expectation value.

14. The device receiver as recited in claim 13, wherein the ratio is determined as:

$$x \equiv 2E(S^2)/E(|y|^2)^2$$

wherein variable x is the determined ratio, variable $E(S^2)$ denotes the second expectation value, and variable $E(|y|^2)$ denotes the first expectation value.

15. The device receiver as recited in claim 13, wherein the third expectation value is determined for the ratio that is greater than the configured threshold value, the third expectation value is determined as:

$$Sig1 \equiv E(|y|^2) - \sqrt[2]{E(|y|^2)^2 - 2E(S^2)}$$

wherein variable Sig1 is the third expectation value, variable $E(S^2)$ denotes the second expectation value, and variable $E(|y|^2)$ denotes the first expectation value.

16. The device receiver as recited in claim 13, wherein the fourth expectation value is determined for the ratio that is lesser than the configured threshold value, the fourth expectation value is determining as:

$$Sig2 \equiv E(S^2)/E(|y|^2) \approx P\sigma^2/P = \sigma^2$$

wherein variable Sig2 is the fourth expectation value, variable $E(S^2)$ denotes the second expectation value, variable $E(|y|^2)$ denotes the first expectation value, variable $\sigma^2$ is the average noise power, and variable P is an average received signal power.

17. A method of noise power estimation comprising:
direct current (DC) filtering of a received data packet that includes two or more samples from a periodic sequence;
squaring an absolute value of each sample, wherein a first expectation value is determined based upon an average of the squared absolute value of each sample;
determining a power difference between a pair of samples, wherein a second expectation value is determined based upon an average of a squared determined power difference;
estimating an average noise power based upon the first and second expectation values; and
DC pre-filter compensating of the estimated average noise power.

18. The method as recited in claim 17, wherein the estimated average noise power is determined as:

$$\hat{\sigma}^2 \equiv E(|y|^2) - \sqrt[2]{E(|y|^2)^2 - 2E(S^2)}$$

wherein variable $\hat{\sigma}^2$ is the estimated average noise power, variable $E(S^2)$ denotes the second expectation value, and variable $E(|y|^2)$ denotes the first expectation value.

19. The method as recited in claim 17 further comprising:
determining a ratio based upon the first and second expectation values;
determining a level of signal-to-noise ratio (SNR) based on the determined ratio, wherein the determining of the level of SNR includes comparing of the determined ratio against a configured threshold value; and
approximating the average noise power based upon the determined level of SNR, wherein the approximating includes a determination of a third expectation value or a fourth expectation value.

20. The method as recited in claim 19, wherein the approximation of the average noise power is performed over multiple pairs of periods from the preamble.

* * * * *